United States Patent [19]
Beall et al.

[11] Patent Number: 5,114,643
[45] Date of Patent: May 19, 1992

[54] FABRICATION OF CORDIERITE BODIES

[75] Inventors: Douglas M. Beall, Corning; Evelyn M. DeLiso, Elmira; Martin J. Murtagh, Trumansburg, all of N.Y.

[73] Assignee: Corning Incorporated, Corning, N.Y.

[21] Appl. No.: 654,527

[22] Filed: Feb. 13, 1991

[51] Int. Cl.$^5$ .............................................. C04B 35/14
[52] U.S. Cl. ...................................... 264/63; 501/120
[58] Field of Search ........................... 264/63; 501/120

[56] References Cited

U.S. PATENT DOCUMENTS 4,280,845  7/1981  Matsuhisa .............................. 106/62
4,295,892  10/1981  Matsuhisa et al. ................... 501/120
4,434,117  2/1984  Inoguchi ................................ 264/56

*Primary Examiner*—James Derrington
*Attorney, Agent, or Firm*—L. Rita Quatrini; Richard N. Wardell

[57] ABSTRACT

A body is disclosed which is at least about 90% by weight cordierite, and has a coefficient of thermal expansion of less than about $16 \times 10^{-7}/°C$. from about 25° C. to about 1000° C. Also disclosed is a method of fabricating the body. Raw materials are selected to form a nominal composition consisting essentially of in percent by weight about 11.5 to about 16.5 MgO, about 33.0 to about 41.0 $Al_2O_3$, and about 46.5 to about 53 $SiO_2$. The raw materials can be a combination of silica and magnesium aluminate spinel, a combination of silica, magnesium aluminate spinel, and a MgO yielding component, or a combination of silica, magnesium aluminate spinel, and a $Al_2O_3$ yielding components. The raw materials are provided absent of clay and talc. The raw materials are blended with an effective amount of vehicle and forming aids to impart plastic formability and green strength thereto form a plastic mixture. The raw materials are formed into a green body which is dried and fired at a sufficient temperature for a sufficient time to form the cordierite body.

9 Claims, 1 Drawing Sheet

FABRICATION OF CORDIERITE BODIES

BACKGROUND OF THE INVENTION

This invention relates to a cordierite body which has a low coefficient of thermal expansion (CTE). The invention relates also to a method of fabricating the body which makes use of a composition of raw materials in which at least a portion of the raw materials is provided as magnesium aluminate spinel which will be referred to as spinel. The raw materials are absent of clay and absent of talc. More particularly, the body is formed by extrusion. Still more particularly, the extruded body has a honeycomb structure. A cordierite body having a honeycomb structure is especially suited for but not limited to use as a substrate for a catalytic converter for automobiles.

Extruded cordierite honeycombs are manufactured for use as substrates to support catalytically active components for catalytic converters on automobiles. Use of cordierite is favorable in this application because of its good thermal shock resistance. The thermal shock resistance (TSR) is inversely proportional to the coefficient of thermal expansion (CTE). That is, honeycombs with a low thermal expansion have good thermal shock resistance and can survive the wide temperature fluctuations that are encountered in the application.

Up to this time cordierite has been made typically with starting raw materials of clay, talc and alumina. U.S. Pat. No. 3,885,977 relates to extruded honeycombed monolithic fired ceramics made with these raw materials. In this patent it is stated that the orientation of the cordierite crystals in the fired body as measured by the I ratio, comes about because cordierite forms on oriented clay particles which are aligned by the extrusion process resulting in the desired low CTE. Therefore it was believed that the clay was necessary to form cordierite.

U.S. Pat. No. 4,280,845 relates to cordierite ceramic fabricated from a mixture of magnesia material, alumina, and silica raw materials using clay and talc predominately. The magnesia has a particle size of 5-150 microns. Although there are some examples given of using ternary end member oxides, that is magnesium oxide, aluminum oxide, and silica without clay or talc, there is no teaching of using magnesium aluminate spinel as a raw material.

In U.S. Pat. No. 4,434,117, it has been further suggested that the use of a platy talc without clay is a ncessary and sufficient condition in order to achieve a cordierite body with a low coefficient of thermal expansion when this platy talc is combined with other non-clay components to obtain the cordierite composition.

SUMMARY OF THE INVENTION

In accordance with one aspect of the invention, there is provided a body which is at least about 90% by weight cordierite, and has a coefficient of thermal expansion of less than about $16 \times 10^{-7}/°$ C. from about 25° C. to about 1000° C.

In accordance with another aspect of the invention, there is provided the following method for fabricating the body. Raw materials are selected to form a nominal composition consisting essentially of in percent by weight about 11.5 to about 16.5 MgO, about 33.0 to about 41.0 $Al_2O_3$, and about 46.5 to about 53 $SiO_2$. The raw materials can be a combination of silica and magnesium aluminate spinel, a combination of silica, magnesium aluminate spinel, and a MgO yielding component, or a combination of silica, magnesium aluminate spinel, and a $Al_2O_3$ yielding component. The raw materials are provided absent of clay and talc. The raw materials are blended with an effective amount of vehicle and forming aids to impart plastic formability and green strength thereto and form a plastic mixture. The raw materials are formed into a green body which is dried and fired at a sufficient temperature for a sufficient time to form the cordierite body.

DETAILED DESCRIPTION OF THE INVENTION

Figure 1:
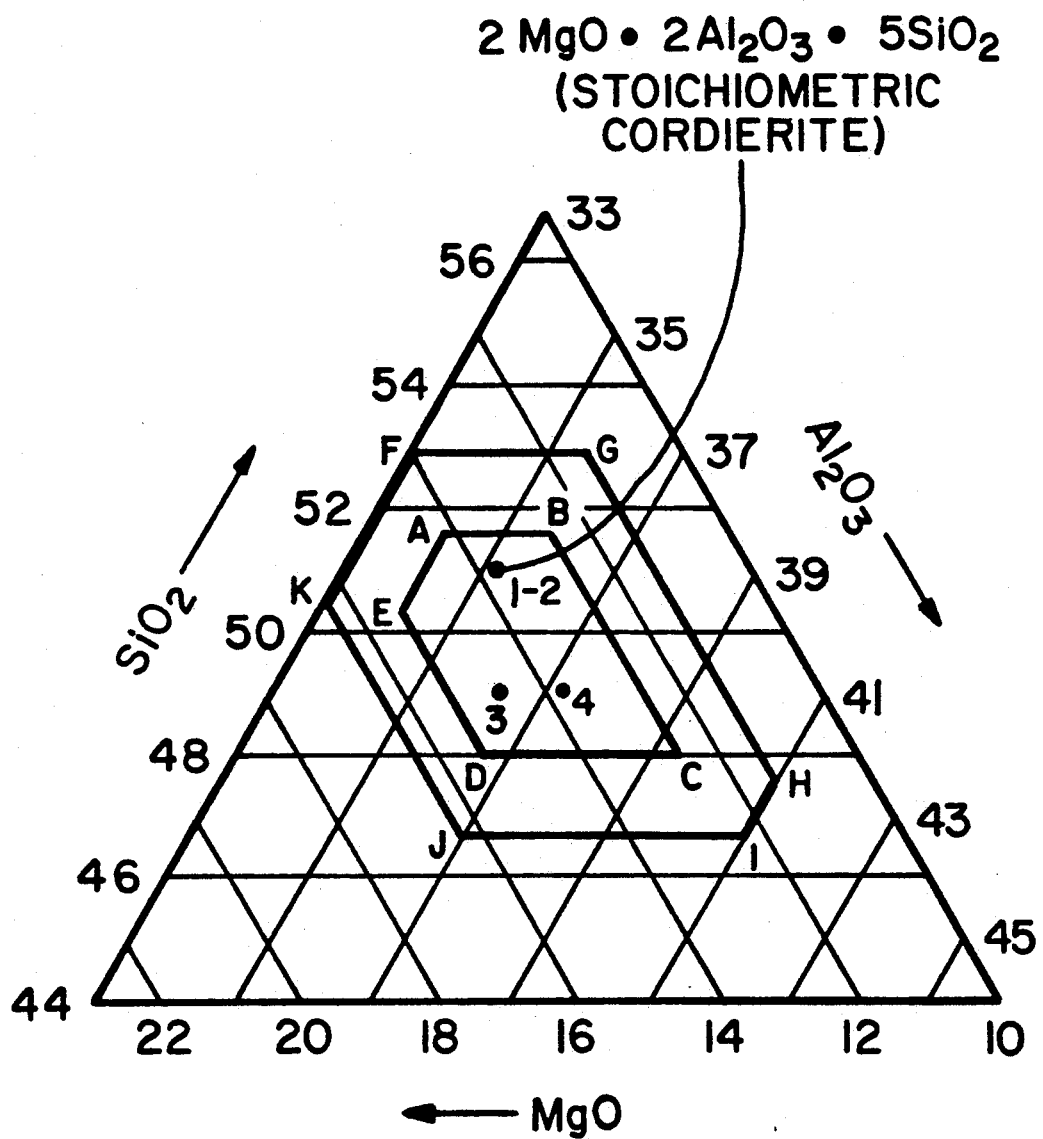
FIG. 1 is a ternary phase diagram of the $SiO_2$-$Al_2O_3$-MgO system showing the region of the raw material compositions of the present invention.

This invention relates to cordierite bodies and to a method for fabricating the bodies which makes use of a two component raw material composition of magnesium aluminate spinel and silica. The compositions can have minor additions of an aluminum oxide component or a magnesium oxide component. The raw materials are provided without clay and without talc. According to the present invention clay and talc are taken to mean clay and talc as is, or their calcined equivalents, that is, clays and talcs which have had their crystalline water removed, for example, by heating. The body has a low CTE, and is well oriented as measured by the I ratio using x-ray diffraction techniques.

The bodies fabricated by the method of the present invention can have any shape and size convenient for the application. In accordance with a preferred embodiment, the bodies have a honeycomb structure which is obtained preferably by extrusion.

Honeycomb bodies contain open cells which are formed by thin porous intersecting walls. The entirety of the open cells is enclosed by an outer wall which defines the shape of the body. The cells normally extend along the length of the body and occupy the entire length. There can be any number or density of cells. Typically however, honeycombs have transverse cell densities of about 7.75 cells/cm² to about 400 cells/cm² or more with wall thicknesses of about 0.05 mm to about 1.27 mm, although this can vary with the application.

The bodies of the present invention especially in the above described honeycomb structure are suitable for use as catalytic converters especially but not exclusively for use in automobiles.

The raw materials of the present invention are selected to form a nominal composition consisting essentially of in percent by weight about 11.5 to about 16.5 MgO, about 33.0 to about 41.0 $Al_2O_3$, 46.5 to about 53 $SiO_2$. This composition is shown in FIG. 1 by the area FGHIJK. One preferred nominal composition consists essentially of in percent by weight about 12.5 to about 15.5 MgO, about 34.2 to about 39.5 $Al_2O_3$, 48.0 to about 51.6 $SiO_2$. This preferred composition is shown in FIG. 1 by the area ABCDE.

The raw materials can be in combinations as follows:
(1) a first combination consisting essentially of silica, and spinel,
(2) a second combination consisting essentially of silica, spinel, and a MgO yielding component. The MgO yielding component is provided preferably in the form of magnesium oxide itself, magnesium hydroxide, magnesium carbonate, magnesium nitrate, and combinations of these, and (3) a third combination consisting essentially of silica, spinel, and a $Al_2O_3$ yielding component. The $Al_2O_3$ yielding component is provided preferably in the form of aluminum oxide itself, aluminum hydroxide, aluminum nitrate, aluminum carbonate, and combinations of these.

One especially preferred composition consists essentially of in percent by weight about 48.6% spinel and the balance silica. The compositions of the present invention result in formation of cordierite in the subsequent firing step.

The magnesium aluminate spinel $MgO.Al_2O_3$, can be obtained from any source. It is desirable that the mean particle diameter of the spinel be less than about 15 micrometers. Particle size measurements referred to in the present invention are measured by Microtrac analysis.

The silica can be any of the types commercially available. One preferred silica is an alpha quartz with a median particle size of about 6.0 micrometers in diameter.

Although the composition is relatively pure, some allowance is made for impurities. Impurities within the cordierite body are of concern since these can affect properties such as increasing CTE. Typically cordierite bodies are affected by impurities such as CaO, $K_2O$, $Na_2O$, $Fe_2O_3$, etc. and can contain total body impurities up to about 3.0% by weight. These impurities must be closely controlled. In the cordierite bodies of the present teaching, the components spinel and silica are generally synthetic or high purity with a total purity content of $\leq 0.5\%$ by weight for the final body.

The above composition of raw materials is intimately blended with a vehicle and forming aids which impart plastic formability and green strength to the raw materials when they are shaped into a body. When the forming is done by extrusion, the extrusion aids most typically used are methyl cellulose which serves as a binder, and a lubricant such as sodium stearate, although the invention is not limited to these.

The relative amounts of forming aids can vary depending on factors such as nature and amounts of raw materials used, etc. However, the typical amounts are about 2% to about 10% and preferably about 3% to about 6% by weight of methyl cellulose, and about 0.5% to about 1% by weight sodium stearate and preferably about 0.6% by weight. As an example of how the percent levels of forming aids are determined: for a 1000 g batch based on the oxide content, (MgO, $Al_2O_3$, and $SiO_2$) for a 5% by weight level of methyl cellulose, about 50 g of methyl cellulose would be added to the batch, and for a 0.5% by weight level of sodium stearate, about 5 g of sodium stearate would be added.

In accordance with a preferred embodiment, for an extrusion process, the raw material composition and extrusion aids are mixed in dry form and then mixed with water as the vehicle. The amount of water can vary from one batch of materials to another and therefore is determined by pre-testing the particular batch for extrudability, that is for ability to attain the proper extrusion pressures.

The raw materials in the resulting plastic mixture are then formed into a green body. Bodies which have not been sintered are referred to as green bodies. The forming can be done by any method. The forming is done preferably by extrusion. Extrusion techniques are well known in the art. Some examples of preferred techniques will be given in the examples that follow for fabrication of the preferred types of bodies. The body is extruded preferably into a honeycomb body.

Once the green body is formed it is dried and then fired at a sufficient temperature for a sufficient time to form a cordierite body. The firing is done preferably according to the following schedule. The body is heated from room temperature (approximately 25° C.) to about 1380° C. to about 1450° C. and held for a sufficient time to form cordierite.

The resulting fired body is at least about 90% by weight cordierite.

The body is characterized by a low CTE. For example, the CTE is less than about $16 \times 10^{-7}/°$ C. from about 25° C. to 1000° C. Typically the CTE is less than about $11 \times 10^{-7}/°$ C. from about 25° C. to 1000° C. And most typically the CTE is less than about $8 \times 10^{-7}/°$ C. about 25° C. to 1000° C.

The body when formed as a honeycomb structure for example, by extrusion, is further characterized by the I ratio. The I ratio is represented by the formula $$I \text{ ratio} = \frac{I_{(110)}}{I_{(110)} + I_{(002)}}$$

where $I_{(110)}$ and $I_{(002)}$ are the peak heights of the reflections from the (110) and (002) planes respectively. The axial and transverse I ratio refer to different orientations of a honeycomb sample in the x-ray beam. The x-ray beam impinges a planar surface at an angle. Measurements of the transverse I ratio are made when the planar surface of the sample is the flat surface made up of as formed wall surfaces of the honeycomb. Measurements of the axial I ratio are made off a plane which is perpendicular-to that for a transverse I ratio where the planar surface on which the x-rays impinge consists of the cross-sectional ends of the honeycomb webs. For a completely randomly oriented cordierite, the I ratio will be about 0.65. If the I ratio measured in the transverse direction with respect to the extrusion direction of the body exceeds 0.69 or the axial I ratio with respect to the extrusion direction is less than about 0.61, then the cordierite crystallites are becoming substantially oriented with respect to the plane of the webs. A high transverse I ratio, or conversely, a low axial I ratio will yield a low thermal expansion as measured in the extrusion or axial direction. It should be noted that in some cases the thermal expansion can be lower than expected from I ratio alone and this can be due to the influence of microcracking as is well known in the state of the art for anisotropic polycrystalline bodies. The bodies of the present invention typically have a transverse I raio of greater than about 0.69, and an axial I ratio of less than about 0.61.

The porosity of the bodies is less than about 35%. The shrinkage and porosity vary as the composition of the raw materials varies within the range of the invention.

To more fully illustrate this invention, the following non-limiting example is presented.

EXAMPLE

Several 1000g batches of dry powders are made of the the components spinel, silica, magnesium oxide, and aluminum oxide as raw materials for subsequent formation of a cordierite honeycomb. The raw material batches are each mixed with methyl cellulose and sodium stearate as a lubricant for the subsequent extrusion operation. The raw materials, methyl cellulose and sodium stearate are mixed in a Littleford mixer for about 3 minutes in order to obtain a homogeneous dry blend. The batch is then transferred to a plasticizing mixer such as a muller, sigma blade mixer, etc. and water is added to the dry components in an amount sufficient to form a plasticized batch. The resulting mix is blended for about 10–15 minutes to make a plastic mixture. One inch diameter green honeycomb pieces with a geometry of about 62 cells/cm$^2$/ and 0.15 mm wall thickness are extruded using about a 25 ton ram extruder. After drying, the green pieces are fired by heating to a temperature of about 1430° C and maintaining that temperature for about 10 hours. The properties of the fired bodies are given in Table 1 below for the various compositions.

TABLE 1

| Description | Batch No. | | | | |
|---|---|---|---|---|---|
| | 1 | 2 | 3 | 4 | 5 |
| Components (wt. % in batch) | | | | | |
| Spinel (Cernel 75) | 48.6 | | 50.5 | 48.6 | 32.2 |
| Spinel (Sumitomo) | | 48.6 | | | |
| Silica (Imsil A-25) | 51.4 | 51.4 | 49.0 | 49.0 | 67.8 |
| MgO | | | 0.5 | | |
| Al$_2$O$_3$ | | | | 2.4 | |
| Methyl cellulose Methocel$^R$ | 6.0 | 6.0 | 6.0 | 6.0 | 6.0 |
| Sodium stearate | 0.6 | 0.6 | 0.6 | 0.6 | 0.6 |
| Water content (wt. % of dry powders) | 41.5 | 20.6 | 45.0 | 44.5 | 34.5 |
| Firing schedule: top temp °C./hrs. held | 1430/10 | 1430/10 | 1430/10 | 1430/10 | 1380/5 |
| Properties of cordierite body | | | | | |
| CTE$_{25-800}$ ($\times 10^{-7}$/°C. | 5.0 | 1.8 | 9.3 | 10.5 | 29.0 |
| CTE$_{25-1000}$ ($\times 10^{-7}$/°C. | 6.8 | 4.0 | 10.9 | 11.8 | 25.6 |
| I ratio (transverse) | 0.79 | 0.85 | 0.74 | 0.77 | 0.83 |
| Firing shrinkage % | 7.3 | +0.36 | 28.8 | 27.1 | 3.4 |
| Porosity % | 31.7 | 27.9 | 16.0 | 22.0 | 33.2 |
| Pore size, μm | 5.0 | 5.0 | 6.5 | 5.4 | 1.2 |
| MOR, psi | 2510 | 2900 | 2990 | 3850 | |

The positions of compositions 1–4 are shown in the phase diagram in FIG. 1.

It can be seen that with the compositions of the present invention, Batches 1, 2, 3 and 4, the CTE's are low, the transverse I ratios are high and the porosity is relatively low. Batch 5, the raw material composition of which is outside the present invention exhibits a high CTE in the product body because it has a high amount of cristobalite in addition to cordierite.

It is interesting to note that the above batches made without clay and without talc are highly oriented as measured by the I ratio. These examples demonstrate also that low CTE cordierite bodies can be obtained with a two component system consisting of magnesium aluminate spinel and silica.

It should be understood that while the present invention has been described in detail with respect to certain illustrative and specific embodiments thereof, it should not be considered limited to such but may be used in other ways without departing from the spirit of the invention and the scope of the appended claims.

What is claimed is:

1. A method of fabricating a cordierite body, said method comprising:
    a) selecting raw materials to form a nominal composition consisting essentially of in percent by weight about 11.5 to about 16.5 MgO, about 33.0 to about 41.0 Al$_2$O$_3$, and about 46.5 to about 53 SiO$_2$ said raw materials being selected from the group consisting of a first combination consisting essentially of silica and magnesium aluminate spinel, a second combination consisting essentially of silica, magnesium aluminate spinel, and a MgO yielding component, and a third combination consisting essentially of silica, magnesium aluminate spinel, and a Al$_2$O$_3$ yielding component, said raw materials being provided absent of clay and absent of talc;
    b) intimately blending said raw materials with an effective amount of vehicle and forming aids to impart plastic formability and green strength to said raw materials and form a plastic mixture;
    c) forming said raw materials into a green body;
    d) drying said green body; and
    e) firing said green body at a sufficient temperature for a sufficient time to form a cordierite body of at least about 90% by weight cordierite, wherein the coefficient of thermal expansion of said cordierite body is less than about $16 \times 10^{-7}$/° C. from about 25° C. to about 1000° C.

2. A method of claim 1 wherein said nominal composition consists essentially of in percent by weight about 12.5 to about 15.5 MgO, about 34.2 to about 39.5 Al$_2$O$_3$, and about 48.0 to about 51.6 SiO$_2$.

3. A method of claim 1 wherein said magnesium oxide yielding component is selected from the group consisting of magnesium oxide, magnesium hydroxide, magnesium carbonate, magnesium nitrate, and combinations thereof.

4. A method of claim 1 wherein said aluminum oxide yielding component is selected from the group consisting of aluminum oxide, aluminum hydroxide, aluminum nitrate, aluminum carbonate, and combinations thereof.

5. A method of claim 1 wherein said forming is done by extruding said raw materials into said green body.

6. A method of claim 1 wherein said cordierite body has a honeycomb structure.

7. A method of claim 6 wherein the transverse I ratio of said cordierite body is greater than about 0.69, and wherein the axial I ratio is less than about 0.61.

8. A method of claim 1 wherein said coefficient of thermal expansion is less than about $11 \times 10^{-7}$/° C. from about 25° C. to about 1000° C.

9. A method of claim 8 wherein said coefficient of thermal expansion is less than about $8 \times 10^{-7}$/° C. from about 25° C. to about 1000° C.

* * * * *